United States Patent [19]

Van Wingerden et al.

[11] 4,221,175

[45] Sep. 9, 1980

[54] APPARATUS AND METHOD FOR PLANTING SEED

[76] Inventors: Aart Van Wingerden, R.R. 2, Fletcher, N.C. 28732; Tom Visser, Post Box 5103, 's=Gravendeel, Netherlands

[21] Appl. No.: 957,180

[22] Filed: Nov. 2, 1978

[51] Int. Cl.³ .................................................. A01C 7/04
[52] U.S. Cl. ........................................ 111/1; 47/1 A; 141/239; 141/141
[58] Field of Search ............ 47/1, 73, 74, 75, 76, 47/77, 78, 1 A; 111/1; 141/106, 319, 320, 321, 322, 239, 241, 346

[56] References Cited

U.S. PATENT DOCUMENTS

| | | | |
|---|---|---|---|
| 678,272 | 7/1901 | Neumayer | 141/241 X |
| 1,357,013 | 10/1920 | Warnecke | 111/1 |
| 2,574,727 | 11/1951 | Burkett | 141/319 X |
| 2,765,957 | 10/1956 | Andres | 111/1 X |
| 3,627,173 | 12/1971 | Kerker | 111/1 X |
| 3,738,530 | 6/1973 | Fine et al. | 111/1 X |
| 4,046,285 | 9/1977 | Wendt | 111/1 X |
| 4,062,385 | 12/1977 | Katusha | 141/364 |

Primary Examiner—Edgar S. Burr
Assistant Examiner—James R. Feyrer
Attorney, Agent, or Firm—Bailey, Dority & Flint

[57] ABSTRACT

An apparatus and method is illustrated wherein seedlings carried in spaced relation in cellular trays receivable for inversion with subsequent release into means for distributing the seeds over a larger area occupied by segregated portions of growing medium.

4 Claims, 5 Drawing Figures

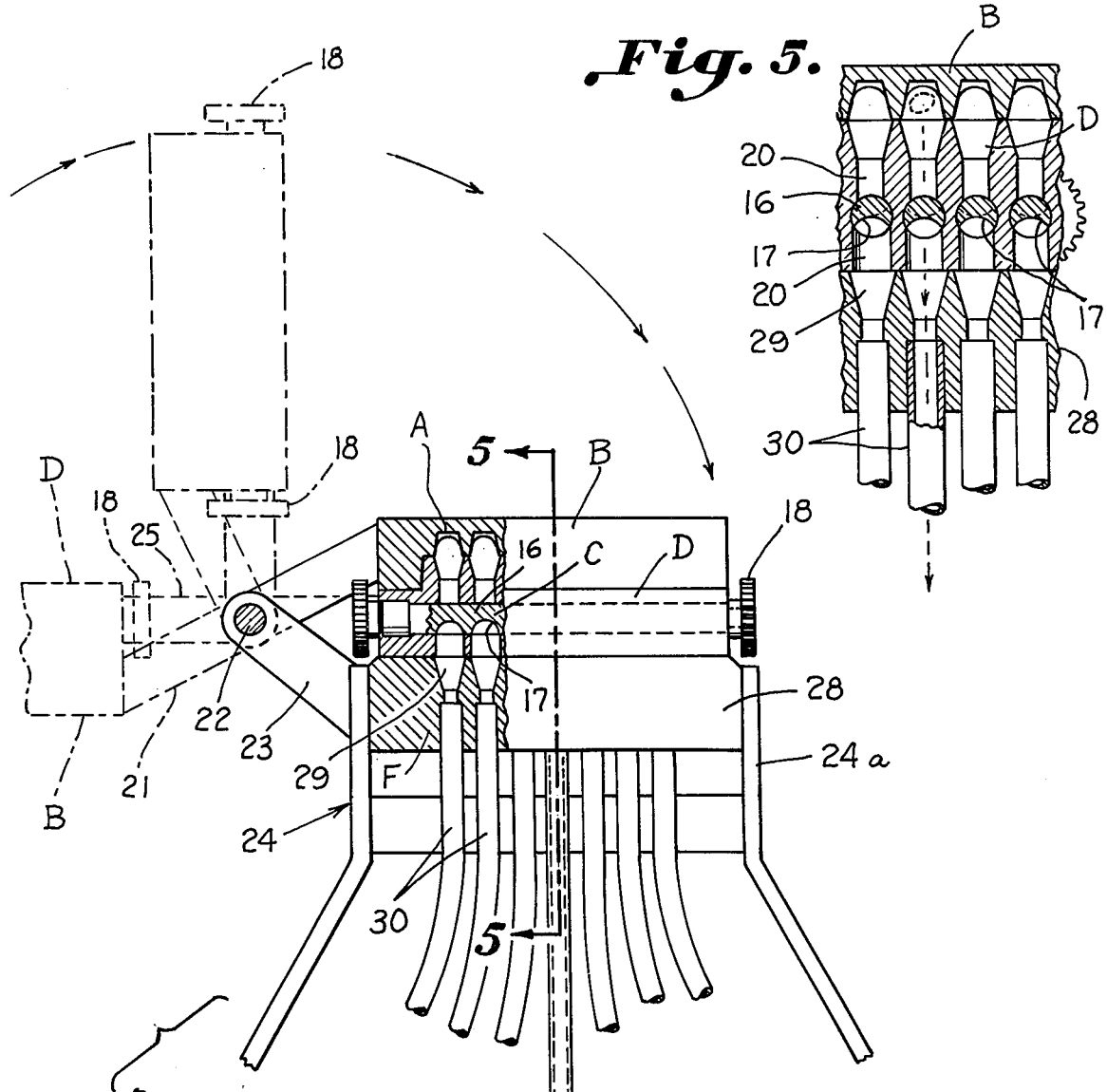
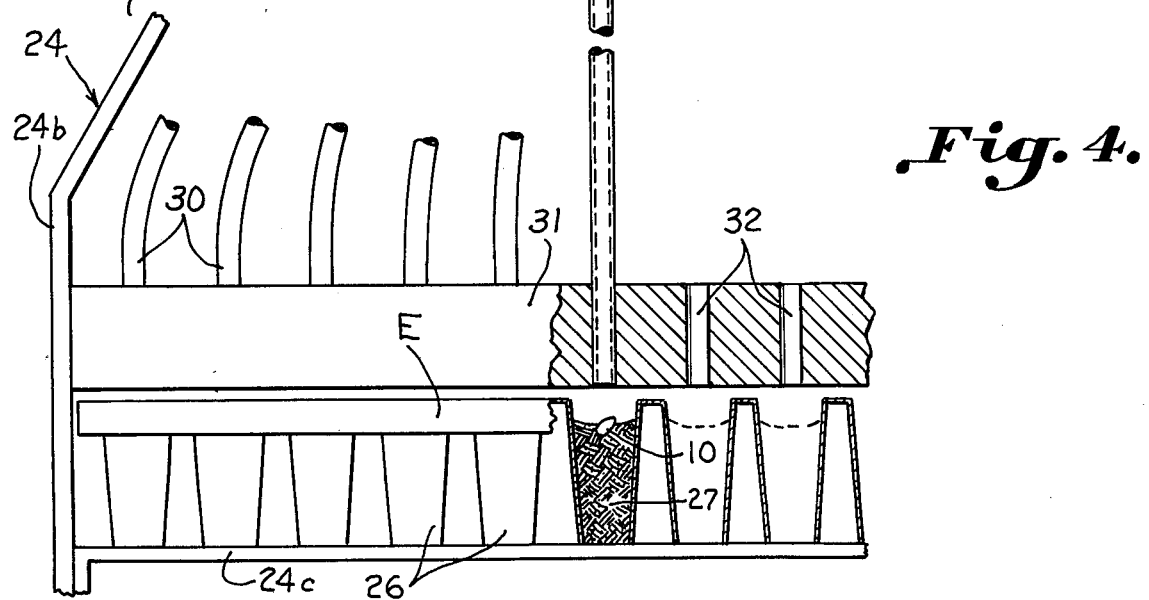

APPARATUS AND METHOD FOR PLANTING SEED

BACKGROUND OF THE INVENTION

Apparatus has been provided heretofore for growing seeds in discrete areas or portions of planting medium. Such systems are known as "plug" systems wherein seedlings first grown in small trays are later planted in larger areas or plugs of growing medium. The prior art also contemplates suction systems for receiving individual seeds from a tray and then planting them. The seedlings and plant medium may then be ejected through the bottom of the planting tray. This latter system is illustrated in U.S. Pat. No. 3,903,643.

BRIEF DESCRIPTION OF THE INVENTION

The apparatus and method of the present invention contemplates the provision for receiving trays containing individualized seeds for inversion and simultaneous release into delivery means for sowing over a larger area containing individualized plots of planting medium similar to those which receive seedlings of the plug system. According to the present invention, not seedlings from trays but the seeds themselves, are received by the larger area occupied by the "plugs".

Most flower and vegetable seeds are sold per seed or by weight by the seed companies in sealed packages. The preservability of the seeds is for many growers a problem because the seeds have to be kept at a certain temperature and humidity to maintain the germination rate of the seed. When the seal of the package is broken, deterioration as a result of at least partial germination usually sets in. The method of germinating the seeds includes sowing them over a growth medium. The seedlings are grown to a certain size and then uprooted and transplanted.

Disadvantages of this system stem from the fact that the plant is uprooted before transplanting in the growth medium. The root system has to settle again in the new growth medium which causes a delay in growth of the plant or the plant may even die of shock. Since every seedling does not have the same amount of space in the growth medium, there is an insufficiency of growing medium in the case of many of the seeds. This system of growing the seedling is not suitable for full automation including automatic sorting and transplanting of the seedlings.

The present invention contemplates spacing the seed equally in relation to one another by means of cell dividers. This system solves the problem of the transplanting shock because the seedling developes a root system in the cell that is separated from the others. Further automation is made possible including grading and automatic transplanting. Another advantage is the saving of fuel in the wintertime because the plants can stay a longer period in germinating trays which occupy less space than the larger growing areas usually utilized later.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 4 is an end elevation illustrating apparatus constructed in accordance with the present invention, with parts broken away, including apparatus for delivering the seeds to the larger plug tray; and FIG. 5 is an enlarged longitudinal sectional elevation taken on the line 5—5 in FIG. 4.

DESCRIPTION OF A PREFERRED EMBODIMENT

Apparatus for planting seedlings is illustrated wherein seed trays are provided having a plurality of spaced cells A for containing respective seeds. Receiving means carry seeds in spaced relationship to each other, being illustrated as receiving the cells in spaced complementary openings. Releasing means C free the seeds from the receiving means B. Delivery means D feed the seeds by gravity to a growing medium. Means including a compartmentalized tray E carry growing medium for receiving the seeds in spaced relation therein for growing the seedlings. Distributing means F are provided for guiding the seeds from the delivery means to a compartmentalized tray which is larger then the seed trays.

Figure 1:
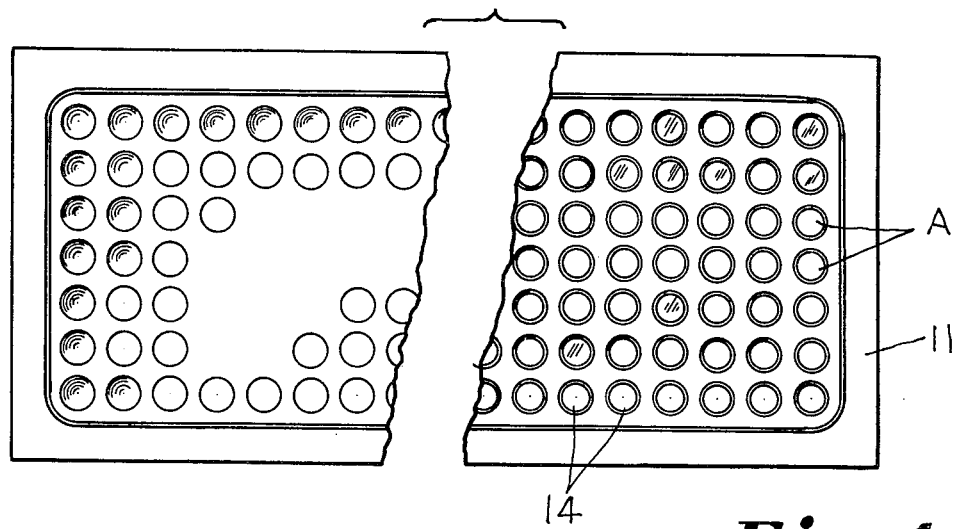
FIG. 1 is a plan view illustrating a cellular tray constructed in accordance with the invention.
Figure 2:
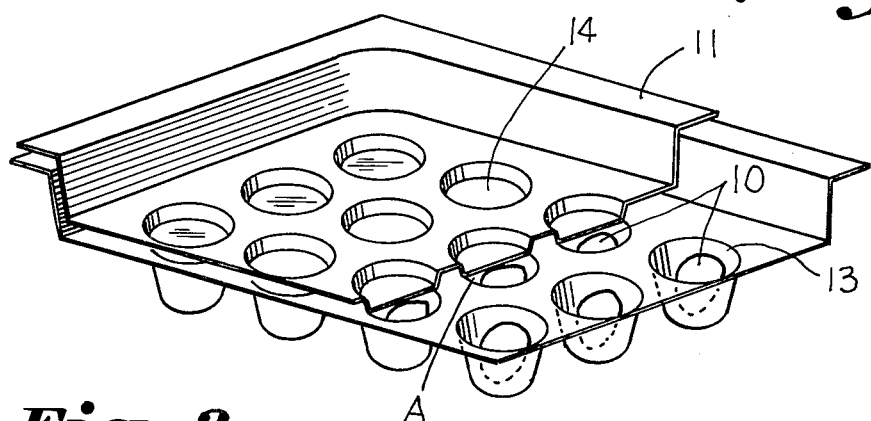
FIG. 2 is an enlarged perspective view looking into the upper left hand corner of the tray in FIG. 1 with parts in section illustrating the cell construction.
Figure 3:
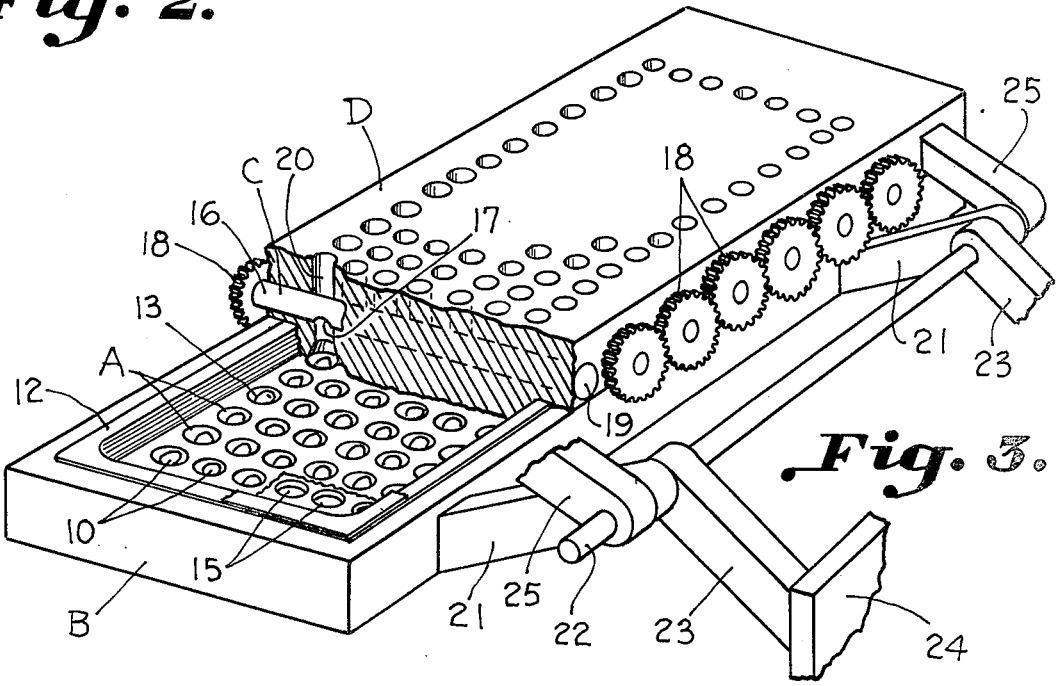
FIG. 3 is a perspective view illustrating that part of the apparatus for receiving and inverting the trays as well as delivering the seeds therefrom simultaneously.

The seed trays have spaced cells A for containing individualized seeds 10. FIGS. 2 and 3 illustrate top and bottom trays 11 and 12, respectively. The bottom trays 12 have spaced compartments 13 therein while the top trays have recessed closure members 14, both forming the closed cells A.

The receiving means B has a number of complementary openings 15 for receiving the spaced compartments 13 and seeds 10 carried therein. Releasing means C include shaft members 16 having spaced aligned cavities 17 therein. Means including a gear train 18 provided for rotating the shaft members 16. Gears 18 are attached at alternate ends of adjacent shafts.

The shaft members 16 are carried in transverse bores 19 (FIG. 3) in the delivery means D which is illustrated essentially in the form of a block. The block has spaced vertical passageways 20 intersecting the bores 19 extending entirely therethrough.

The receiving means B is pivotally mounted on the assembly hereof by spaced arms 21 extending integrally therefrom for pivotal mounting upon a shaft 22 which has fixed mounting upon brackets 23 carried upon an upper portion 24a of an upright frame, broadly designated at 24. The delivery means D is also pivotally mounted upon the shaft 22 upon spaced arms 25 extending integrally therefrom.

The compartmentalized tray E is carried in an enlarged lower frame portion 24b upon a base member 24c. The tray includes compartments 26 carrying growing medium 27. The distribution means F includes a base member 28 having spaced openings 29 therein. The openings 29 have a portion opening into the vertical passageways 20 on one end while receiving the tubes 30 of the delivery means E at the other end. A base support member 31 has openings 32.

OPERATION

The seed pack or tray, is first placed within the receiving means B and the releasing means C pivoted downwardly into position. These devices are then inverted and the delivery means, which is carried by the releasing means C is received in register with the distributing means F, which includes a number of tubes which are spaced further apart adjacent the growing medium. The compartmentalized tray E contains the growing medium and receives the seeds therefrom after the releasing means and receiving means are rotated 180 degrees into the proper position. Because of the fact that the seeds are planted initially in the larger growing area afforded by the "plugs" they may be retained therein longer, avoiding shock and reducing the cost of growing larger more useful seedlings and may be replanted directly in the ultimate growing area.

The filling of the seed tray or cartridge is done by the seed companies. The grower can buy a seed tray with a certain number of isolated seeds therein. The prepacking of the seed measures the number of seed packed and aids in sowing the seed in the trays with the distribution of the seed over a certain number of plugs of a growth medium.

The method hereof has many advantages for small as well as big growers. The starting point with the development of this system is the separation between the seedling process, in trays, and the actual seeding under controlled conditions such as humidity, dust and temperature levels which are found in normal working areas in horticulture. The seeding process has to take place under controlled conditions by which the dividing of seed has become possible with the present equipment. The investment in equipment for the dividing of the seeds has become possible now because the equipment can be used the whole year round. The plug system, as mentioned above, separated cells, has become possible for every grower due to the low investment of the equipment. Management advantages are found in the flexibility on the usage of the system in relation to time and place by unskilled people.

While a preferred embodiment of the invention has been described using specific terms, such description is for illustrative purposes only, and it is to be understood that changes and variations may be made without departing from the spirit or scope of the following claims.

What is claimed is:

1. The method of planting seeds and the like into a seed growing medium comprising the steps of:
    segregating and spacing seeds from one another in a tray containing spaced cells;
    placing the tray in an apparatus for planting seeds into a growing medium;
    opening the cells from the top thereof;
    inverting the tray;
    feeding the seeds from the cells; and
    guiding and spreading the seeds by gravity to said growing medium extending over a larger area than that occupied by the cells.
2. Apparatus for planting seeds into a growing medium from a prepacked seed tray comprising:
    a prepacked seed tray means, said prepacked tray having a plurality of spaced cells, each cell adapted to contain at least one seed;
    receiving means for receiving said seed tray means;
    releasing means freeing the seeds from said receiving means and adapted to be positioned over said receiving means with said seed tray means positioned therebetween;
    inverting means for inverting said receiving means with said releasing means therewith for freeing seeds for passage;
    delivery means adapted to be mateingly positioned with the receiving and releasing means for feeding the seeds by gravity to the growing medium; and
    means carrying said growing medium for receiving the seeds in spaced relation therein;
    a spaced cellular tray carrying seeds in discreet areas for positioning in said receiving means; and
    means inverting said receiving means with said releasing means positioned thereon freeing seeds for passage to said delivery means.
3. The structure set forth in claim 1 wherein said delivery means includes a plurality of spaced tubes communicating with said releasing means on one end and with said growing medium on the other; said spaced tubes being spread a greater distance from each other adjacent said growing medium to compensate for a greater spacing thereof than the spacing of said receiving means.
4. The structure set forth in claim 3 including distributing means supporting said receiving and releasing means in inverted position with said tubes therein; and means pivotally mounting said receiving and releasing means for first positioning said releasing means on said receiving means preparatory of inverting same.

* * * * *